US 008918465 B2

(12) United States Patent
Barak

(10) Patent No.: US 8,918,465 B2
(45) Date of Patent: Dec. 23, 2014

(54) AUTHENTICATION OF SERVICE REQUESTS INITIATED FROM A SOCIAL NETWORKING SITE

(75) Inventor: Matan Barak, Ra'anana (IL)

(73) Assignee: LivePerson, Inc., New York, NY (US)

( * ) Notice: Subject to any disclaimer, the term of this patent is extended or adjusted under 35 U.S.C. 154(b) by 0 days.

(21) Appl. No.: 12/967,782

(22) Filed: Dec. 14, 2010

(65) Prior Publication Data

US 2012/0150973 A1    Jun. 14, 2012

(51) Int. Cl.
*G06F 15/16* (2006.01)
*G06F 15/173* (2006.01)
*H04L 29/06* (2006.01)
*G06Q 30/06* (2012.01)

(52) U.S. Cl.
CPC .......... *G06Q 30/0609* (2013.01); *H04L 63/102* (2013.01); *H04L 63/126* (2013.01)
USPC .......................................... 709/205; 709/223

(58) Field of Classification Search
USPC .............................. 709/213, 206, 205; 726/26
See application file for complete search history.

(56) References Cited

U.S. PATENT DOCUMENTS

| | | |
|---|---|---|
| 4,881,261 A | 11/1989 | Oliphant et al. |
| 5,187,735 A | 2/1993 | Herrero Garcia et al. |
| 5,206,903 A | 4/1993 | Kohler et al. |
| 5,208,748 A | 5/1993 | Flores et al. |
| 5,235,519 A | 8/1993 | Miura |
| 5,239,462 A | 8/1993 | Jones et al. |
| 5,262,941 A | 11/1993 | Saladin et al. |
| 5,289,371 A | 2/1994 | Abel et al. |
| 5,319,542 A | 6/1994 | King et al. |
| 5,351,186 A | 9/1994 | Bullock et al. |

(Continued)

FOREIGN PATENT DOCUMENTS

| | | |
|---|---|---|
| EP | 840244 A1 | 5/1998 |
| EP | 1233361 A1 | 8/2002 |

(Continued)

OTHER PUBLICATIONS

Oracle Fusion Middleware Administrator's Guide for Oracle SOA (Oracle Guide) Suite 11g Release 1 (11.1.1)Part No. E10226-02 http://docs.oracle.com/cd/E15523_01/integration.1111/e10226/ns_config.htm) Publication date Oct. 2009. last checked on Jul. 12, 2012.*

(Continued)

*Primary Examiner* — David Lazaro
*Assistant Examiner* — Mahran Abu Roumi
(74) *Attorney, Agent, or Firm* — Kilpatrick Townsend & Stockton LLP

(57) ABSTRACT

Described are computer-based methods and apparatuses, including computer program products, for authenticating user service requests from a social networking site. Data representing a selected message and an originator of the selected message is stored. Data representing a reply to the originator of the selected message is transmitted for posting at the social networking server, the reply including data that causes transmission of a service request to the server when actuated. Data representing the service request and a sender of the service request is received. Data representing a user profile of the sender of the service request is retrieved from the social networking server. One or more attributes of the user profile of the sender are compared against one or more attributes of the stored data representing the originator of the selected message in order to verify the one or more attributes of the user profile.

21 Claims, 4 Drawing Sheets

(56) References Cited

U.S. PATENT DOCUMENTS

| | | |
|---|---|---|
| 5,372,507 A | 12/1994 | Goleh |
| 5,375,055 A | 12/1994 | Togher et al. |
| 5,387,783 A | 2/1995 | Mihm et al. |
| 5,450,537 A | 9/1995 | Hirai et al. |
| 5,517,405 A | 5/1996 | McAndrew et al. |
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenreich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,428 A | 5/2000 | Wang et al. |
| 6,061,658 A | 5/2000 | Chou et al. |
| 6,064,987 A | 5/2000 | Walker et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |

(56) References Cited

U.S. PATENT DOCUMENTS

| | | |
|---|---|---|
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shafiee et al. |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsch |
| 6,839,680 B1 | 1/2005 | Liu |
| 6,850,896 B1 | 2/2005 | Kelman et al. |
| 6,865,267 B2 | 3/2005 | Dezono |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,185,544 B2 * | 5/2012 | Oztekin et al. ............... 707/768 |
| 8,260,846 B2 | 9/2012 | Lahav |
| 8,266,127 B2 | 9/2012 | Mattox et al. |
| 8,386,340 B1 | 2/2013 | Feinstein |
| 8,392,580 B2 | 3/2013 | Allen et al. |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |

(56) References Cited

U.S. PATENT DOCUMENTS

| | | |
|---|---|---|
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McElfresh et al. |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0091832 A1 | 7/2002 | Low et al. |
| 2002/0107728 A1 | 8/2002 | Bailey et al. |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161664 A1 | 10/2002 | Shaya et al. |
| 2002/0167539 A1 | 11/2002 | Brown et al. |
| 2003/0014304 A1 | 1/2003 | Calvert et al. |
| 2003/0023754 A1 | 1/2003 | Eichstadt et al. |
| 2003/0029415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0105826 A1* | 6/2003 | Mayraz .................. 709/206 |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2004/0034567 A1 | 2/2004 | Gravett |
| 2004/0064412 A1 | 4/2004 | Phillips et al. |
| 2004/0088323 A1 | 5/2004 | Elder et al. |
| 2004/0128390 A1 | 7/2004 | Blakley et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0096997 A1 | 5/2005 | Jain et al. |
| 2005/0114195 A1 | 5/2005 | Bernasconi |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0216342 A1 | 9/2005 | Ashbaugh |
| 2005/0256955 A1 | 11/2005 | Bodwell et al. |
| 2005/0262065 A1 | 11/2005 | Barth et al. |
| 2005/0288943 A1 | 12/2005 | Wei et al. |
| 2006/0015390 A1 | 1/2006 | Rijisinghani et al. |
| 2006/0021009 A1 | 1/2006 | Lunt |
| 2006/0026237 A1 | 2/2006 | Wang et al. |
| 2006/0041476 A1 | 2/2006 | Zheng |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0239527 A1 | 10/2007 | Nazer et al. |
| 2007/0250585 A1 | 10/2007 | Ly et al. |
| 2007/0260596 A1 | 11/2007 | Koran et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0147480 A1 | 6/2008 | Sarma et al. |
| 2008/0147741 A1 | 6/2008 | Gonen et al. |
| 2008/0201436 A1 | 8/2008 | Gartner |
| 2008/0215541 A1 | 9/2008 | Li et al. |
| 2008/0222656 A1* | 9/2008 | Lyman ...................... 719/318 |
| 2008/0244024 A1 | 10/2008 | Aaltonen et al. |
| 2008/0262897 A1* | 10/2008 | Howarter et al. ............ 705/10 |
| 2008/0270294 A1 | 10/2008 | Lent et al. |
| 2008/0270295 A1 | 10/2008 | Lent et al. |
| 2008/0319778 A1* | 12/2008 | Abhyanker .................. 705/1 |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0055267 A1 | 2/2009 | Roker |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0138606 A1 | 5/2009 | Moran et al. |
| 2009/0164171 A1 | 6/2009 | Wold et al. |
| 2009/0177771 A1 | 7/2009 | Edward et al. |
| 2009/0210405 A1 | 8/2009 | Ortega et al. |
| 2009/0222572 A1 | 9/2009 | Fujihara |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0307003 A1 | 12/2009 | Daniel et al. |
| 2009/0319296 A1 | 12/2009 | Schoenberg |
| 2010/0023475 A1 | 1/2010 | Lahav |
| 2010/0023581 A1 | 1/2010 | Lahav |
| 2010/0049602 A1 | 2/2010 | Softky |
| 2010/0106552 A1 | 4/2010 | Barillaud |
| 2010/0205024 A1 | 8/2010 | Shachar et al. |
| 2010/0255812 A1* | 10/2010 | Nanjundaiah et al. ........ 455/411 |
| 2010/0281008 A1 | 11/2010 | Braunwarth |
| 2011/0041168 A1 | 2/2011 | Alan et al. |
| 2011/0055207 A1 | 3/2011 | Schorzman et al. |
| 2011/0055331 A1* | 3/2011 | Adelman et al. ............. 709/206 |
| 2011/0055338 A1* | 3/2011 | Loeb et al. ................... 709/206 |
| 2011/0112893 A1 | 5/2011 | Karlsson et al. |
| 2011/0113101 A1* | 5/2011 | Ye et al. ...................... 709/205 |
| 2011/0119264 A1 | 5/2011 | Hu et al. |
| 2011/0138298 A1 | 6/2011 | Anderson et al. |
| 2011/0161792 A1 | 6/2011 | Florence et al. |
| 2011/0208822 A1* | 8/2011 | Rathod ....................... 709/206 |
| 2011/0246406 A1 | 10/2011 | Lahav et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0042389 A1* | 2/2012 | Bradley et al. ................ 726/26 |

(56) References Cited

U.S. PATENT DOCUMENTS

| | | | |
|---|---|---|---|
| 2012/0059722 A1* | 3/2012 | Rao | 705/14.66 |
| 2012/0136939 A1* | 5/2012 | Stern et al. | 709/206 |
| 2012/0150973 A1 | 6/2012 | Barak | |
| 2012/0323346 A1 | 12/2012 | Ashby et al. | |
| 2013/0013362 A1 | 1/2013 | Walker et al. | |
| 2013/0036202 A1 | 2/2013 | Lahav | |
| 2013/0182834 A1 | 7/2013 | Lauffer | |
| 2013/0238714 A1 | 9/2013 | Barak et al. | |
| 2013/0290533 A1 | 10/2013 | Barak | |
| 2013/0311874 A1 | 11/2013 | Schachar et al. | |
| 2013/0326375 A1 | 12/2013 | Barak et al. | |
| 2013/0336471 A1 | 12/2013 | Agarwal et al. | |

FOREIGN PATENT DOCUMENTS

| | | |
|---|---|---|
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 01/35272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | WO 2010/099632 A1 | 9/2010 |
| WO | 2010/119379 A1 | 10/2010 |
| WO | WO 2010/119379 | 10/2010 |
| WO | 2010/144207 A2 | 12/2010 |
| WO | 2011/127049 A1 | 10/2011 |
| WO | 2013/158830 A1 | 10/2013 |
| WO | 2013/163426 A1 | 10/2013 |

OTHER PUBLICATIONS

International Search Report, PCT Application No. PCT/US2011/064946, mailed on Jun. 22, 2012 (3 pgs.).
"OAuth core 1.0 Revision A", [XP002570263] Jun. 24, 2009, OAuth Core Workgroups pp. 1-27 (http://ouath.net/core/1.0a/) (retrieved Jun. 24, 2009).
Chartrand Sabra, "A new system seeks to ease the bottleneck in the customer-service information highway," The New York Times (Apr. 30, 2001), 2 pages.
Just Answer (2004 Faq) Archive.org cache of www.justanswer.com circa (Dec. 2004), 8 pages.
Pack Thomas, "Human Search Engines the next Killer app," (Dec. 1, 2000) Econtent DBS vol. 23; Issue 6, 7 pages.
Match.com "Match.com Launches Match.com Advisors," PR Newswire (Oct. 14, 2003), 2 pages.
SITEL, "SITEL to Provide Live Agent Support Online for Expertcity. com," PR Newswire (Feb. 28, 2000), 2 pages.
Webmaster World, "Link to my website is in a frame with banner ad at the top," www.webmasterworld.com (Nov. 11, 2003), 2 pages.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
FAIRISAAC, "How SmartForms for Blaze Advisor Works," www.fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.

(56) References Cited

OTHER PUBLICATIONS

"Credit", The New Encyclopedia Britannica vol. 3 p. 722. (1994) 3 pages.

"Creditnet.com—An Online Guide to Credit Cards", http://www.creditnet/com. (1999) 1 page.

"Phillips 66 Introduces Mastercard with Rebate Feature", PR Newswire, p914NY067, (Sep. 14, 1995) 1 page.

Anon, "VAR Agreement Expands Credit Bureau Access.", (CCS America, Magnum Communications Ltd expand CardPac access, Computers in Banking, v6, n10, (1) (Oct. 1989) 2 pages.

Wortmann, Harry S., "Reengineering Update—Outsourcing: An Option Full of Benefits and Responsibilities", American Banker, (Oct. 24, 1994), p. 7A vol. 159, No. 205 3 pages.

Anon. "To Boost Balances, AT&T Renews No-Fee Universal Credit Card Offer", Gale Group Newsletter, V 10, N. 13, (Mar. 30, 1992) 2 pages.

Anon. "Citgo Puts a New Spin on the Cobranded Oil Card", Credit Card News, p. 4, (Nov. 1, 1995) 2 pages.

Anon. "Microsoft Targets More than PIM Market with Outlook 2000," Computer Reseller News, N. 805 pp. 99, (Aug. 31, 1998) 2 pages.

Chesanow, Neil, "Pick the Right Credit Cards-and use them wisely", Medical Economics, v. 75, n. 16, p. 94, (Aug. 24, 1998) 4 pages.

Friedland, Marc, "Credit Scoring Digs Deeper into Data", Credit World, v. 84, n. 5 p. 19-23, (May 1996) 5 pages.

Hollander, Geoffrey, "Sibling Tool Personator 3 untangles File Formats", InfoWorld, v20, n5, pp. 102 (Feb. 2, 1998) 2 pages.

Kantrow, Yvette D., "Banks Press Cardholders to Take Cash Advances", American Banker, v. 157, n. 18 pp. 1-2. (Jan. 28, 1992) 2 pages.

Lotus News Release: "Lotus Delivers Pre-Release of Lotus Notes 4.6 Client Provides Compelling New Integration with Internet Explorer", (May 20, 1997) 2 pages.

Stetenfeld, Beth, "Credit Scoring: Finding the Right Recipe", Credit Union Management, v. 17, n 11, pp. 24-26 (Nov. 1994).

Block, Valerie, "Network Assembles Card Issuers at an Internet Site", Am. Banker, V160, (1998) 1 page.

CreditNet Financial Network http://consumers.creditnet.com (1999) 1 page.

Anon., "Lending Tree: Lending Tree Provides Borrowers Fast and Easy Online Access to Multiple Loan Offers," Business Wire, Jun. 23, 1998, 2 pages.

Anon, Regulation Z Commentary Amendments, Retail Banking Digest, vol. 15, No. 2, p. 17-18, (Mar.-Apr. 1995).

Anon, San Diego Savings Association Offers Customers No-Fee Visa Product, Card News, (Feb. 29, 1988) 1 page.

Bloom, J.K., "For This New Visa, Only Web Surfers Need Apply," American Banker, vol. 1163, No. 34 12 (Feb. 20, 1998) 2 pages.

Harney, K.R., "Realty Brokers, Lenders Face Restrictions," Arizona Republic, Final Chaser edition, Sun Living section, (Feb. 10, 1991) 2 pages.

Higgins, K.T., "Mr. Plastic Joins the Marketing Team," Credit Card Management, vol. 6, No. 3, pp. 26-30, Jun. 1993.

Microsoft Press Computer Dictionary, Third Edition, Microsoft Press, Redmond, 1997, 4 pages.

Whiteside, D.E., "One Million and Counting," Collections and Credit Risk, vol. 1, No. 11 (Nov. 1996) 5 pages.

Fickenscher, L., "Providian Undercuts rivals with 7.9% Rate Offer," American banker, vol. 163, Oct. 8, 1998, 2 pages.

Fargo, J., "The Internet Specialists," Credit Card Management, vol. 11, No. 10, pp. 38-45, Jan. 1999.

Lemay, T., "Browsing for a Mortgage a Click away," Financial Post, (Jan. 15, 2000) 1 page.

Wijnen, R., "Banks Fortify Online Services," Bank Technology News, vol. 13, No. 3, Mar. 2000, 3 pages.

Anon. "IAFC Launches NextCard, The First True Internet VISA," Business Wire, New York: (Feb. 6, 1998), 3 pages.

Lazarony, Lucy, "Only Online Applicants Need Apply," Bank Advertising News, North Palm Beach, Mar. 23, 1998, vol. 21, Issue 15, 3 pages.

FIData, Inc., News & Press Releases, "Instant Credit Union Loans via the Internet," http://web.archive.org/web/19990221115203/www.fidata-inc.com/news-pr01.htm (1999) 2 pages.

FIData, Inc., Press Releases, "Instant Loan Approvals via the Internet," http://www.fidata-_inc.com/news/pr_040198.htm, (Apr. 1, 1998) 2 pages.

Staff, "On-Line System Approves Loans While Customer Waits" -Abstract, Communication News, vol. 31, Issue 9, (Sep. 1994) 3 pages.

Anon. "Affordable Lending Systems Now Available for Smaller Financial Institutions," Business Wire, (May 18, 1998), 2 pages.

Nexis—All News Sources—Examiner's NPL Search Results in U.S. Appl. No. 11/932,498, included with Office Action issued Oct. 8, 2008, 14 pages.

"Sample Experian Credit Report" by Consumer Information consumerinfo.com (Jul. 9, 1998) 4 pages.

Plaintiffs Original Complaint, *Nextcard, LLC* v. *Liveperson, Inc.*; Civil Action No. 2:08-cv-00184-TJW, In the U.S. District Court for the Eastern District of Texas, Marshall Division, filed Apr. 30, 2008 (7 pages).

Amended Complaint and Jury Demand; *Liveperson, Inc.* v. *Nextcard, LLC, et al*; Civil Action No. 08-062 (GMS), in the U.S. District Court for the District of Delaware, filed Mar. 18, 2008 (5 pages).

Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 9, 2008 (12 pages).

Defendants HSBC North America Holdings Inc.'s and HSBC USA Inc's Answer, Affirmative Defenses and Counterclaims to Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division filed (Apr. 28, 2008), 13 pages.

Answer and Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed Apr. 28, 2008 (13 pages).

Defendant The PNC Financial Services Group, Inc.'s Answer and Affirmative Defenses to Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 28, 2008, 10 pages.

Plaintiffs Second Amended Reply to Counterclaims of Defendants HSBC North America Holdings Inc. and HSBC USA Inc.; *Nextcard, LLC* v. *American Express Company, et al*; Civil Action No. 2:07-cv-354 (TJW); In the U.S. District Court for the Eastern District of Texas, Marshall Division, filed May 14, 2008, 5 pages.

Plaintiffs Second Amended Reply to Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed May 14, 2008 (71 pages).

Plaintiffs Second Amended Reply to Counterclaims of Defendant American Express Company; *Nextcard, LLC* v. *American Express Company, et al*; Civil Action No. 2:07-cv-354 (TJW); In the U.S. District Court for the Eastern District of Texas, Marshall Division, filed (May 8, 2008), 8 pages.

Justin Hibbard, Gregory Dalton, Mary E Thyfault. (Jun. 1998). "Web-based customer care." Information Week, (684) 18-20, 3 pages.

Kim S. Nash "Call all Customers." Computerworld, 32 (1), 25-28 (Dec. 1997), 2 pages.

PRN: "First American Financial Acquires Tele-Track Inc.,"PR Newswire, (May 11, 1999), Proquest #41275773, 2 pages.

Young, Deborah, "The Information Store," (Sep. 15, 2000), Wireless Review, pp. 42, 44, 46, 48, 50.

Whiting et al., "Profitable Customers," (Mar. 29, 1999), Information Week, Issue 727, pp. 44, 45, 48, 52, 56.

Bayer, Judy, "A Framework for Developing and Using Retail Promotion Response Models," Cares Integrated Solutions, retrieved from www.ceresion.com (2007) 5 pages.

Bayer, Judy, "Automated Response Modeling System for Targeted Marketing," (Mar. 1998), Ceres Integrated Solutions, 5 pages.

(56) References Cited

OTHER PUBLICATIONS

Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click—Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM Sigmetrics Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
International Search Report and Written Opinion for PCT Application No. PCT/US2013/041147, mailed Jul. 30, 2013, 9 pages.
International Search Report and Written Opinion for PCT Application No. PCT/US2013/037086, mailed Jul. 12, 2013, 9 pages.
International Search Report and Written Opinion for PCT Application No. PCT/US2013/29389, mailed Jul. 24, 2013, 8 pages.
International Search Report and Written Opinion for PCT Application No. PCT/US2013/038212, mailed Jul. 17, 2013, 11 pages.
International Search Report for PCT Application No. PCT/US03/41090, mailed on Sep. 1, 2004, 3 pages.
International Search Report for PCT Application No. PCT/US05/40012, mailed on Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, mailed on Jul. 7, 2011, 3 pages.
International Preliminary Report on Patentability for PCT Application No. PCT/US2011/031239, dated Oct. 9, 2012, 8 pages.
Non-Final Office Action of Dec. 11, 2008 for U.S. Appl. No. 11/394,078, 15 pages.
Final Office Action of Jul. 9, 2009 for U.S. Appl. No. 11/394,078, 15 pages.
Non-Final Office Action of Jan. 28, 2010 for U.S. Appl. No. 11/394,078, 14 pages.
Final Office Action of Jul. 9, 2010 for U.S. Appl. No. 11/394,078, 16 pages.
Non-Final Office Action of Feb. 1, 2011 for U.S. Appl. No. 11/394,078, 20 pages.
Final Office Action of Aug. 2, 2011 for U.S. Appl. No. 11/394,078, 23 pages.
Non-Final Office Action of May 16, 2012 for U.S. Appl. No. 11/394,078, 23 pages.
Final Office Action of Jan. 25, 2013 for U.S. Appl. No. 11/394,078, 22 pages.
Non-Final Office Action of Jun. 22, 2012 for U.S. Appl. No. 13/080,324, 9 pages.
Non-Final Office Action of Aug. 15, 2012 for U.S. Appl. No. 12/967,782, 31 pages.
Non-Final Office Action of Jul. 29, 2011 for U.S. Appl. No. 12/608,117, 20 pages.
Final Office Action of Apr. 4, 2012 for U.S. Appl. No. 12/608,117, 25 pages.
Non-Final Office Action of Apr. 24, 2004 for U.S. Appl. No. 09/922,753, 16 pages.
Final Office Action of Oct. 14, 2004 for U.S. Appl. No. 09/922,753, 13 pages.
Non-Final Office Action of May 17, 2005 for U.S. Appl. No. 09/922,753, 13 pages.
Non-Final Office Action of Mar. 14, 2006 for U.S. Appl. No. 09/922,753, 13 pages.
Final Office Action of Jul. 26, 2006 for U.S. Appl. No. 09/922,753, 13 pages.
Non-Final Office Action of Aug. 13, 2008 for U.S. Appl. No. 09/922,753, 10 pages.
Final Office Action of Apr. 23, 2009 for U.S. Appl. No. 09/922,753, 11 pages.
Non-Final Office Action of Jul. 21, 2009 for U.S. Appl. No. 09/922,753, 10 pages.
Final Office Action of Feb. 18, 2010 for U.S. Appl. No. 09/922,753, 9 pages.
Non-Final Office Action of Apr. 25, 2011 for U.S. Appl. No. 09/922,753, 9 pages.
Final Office Action of Nov. 25, 2011 for U.S. Appl. No. 09/922,753, 10 pages.
Non-Final Office Action of Aug. 7, 2007 for U.S. Appl. No. 10/980,613, 16 pages.
Non-Final Office Action of May 15, 2008 for U.S. Appl. No. 10/980,613, 23 pages.
Non-Final Office Action of Apr. 30, 2012 for U.S. Appl. No. 12/504,265, 16 pages.
Final Office Action of Aug. 28, 2012 for U.S. Appl. No. 12/504,265, 28 pages.
Final Office Action of Feb. 14, 2013 for U.S. Appl. No. 13/080,324, 11 pages.
Final Office Action of Apr. 11, 2013 for U.S. Appl. No. 12/967,782, 18 pages.
Non-Final Office Action of Jun. 12, 2013 for U.S. Appl. No. 12/608,117, 56 pages.
Non-Final Office Action of Jul. 8, 2013 for U.S. Appl. No. 13/413,197, 10 pages.
Non-Final Office Action of Jun. 27, 2013 for U.S. Appl. No. 12/504,265, 11 pages.

(56) References Cited

OTHER PUBLICATIONS

Non-Final Office Action of Jun. 20, 2013 for U.S. Appl. No. 13/157,936, 19 pages.
Non-Final Office Action of May 10, 2013 for U.S. Appl. No. 13/563,708, 20 pages.
Non-Final Office Action of Mar. 30, 2013 for U.S. Appl. No. 11/360,530, 23 pages.
Non-Final Office Action of Dec. 5, 2013 for U.S. Appl. No. 12/967,782, 14 pages.
Final Office Action of Oct. 21, 2013 for U.S. Appl. No. 12/504,265 14 pages.
Non-Final Office Action of Oct. 30, 2013 for U.S. Appl. No. 13/961,072, 10 pages.
Notice of Allowance of Jan. 3, 2014 for U.S. Appl. No. 11/360,530, 29 pages.
Final Office Action of Jan. 22, 2014 for U.S. Appl. No. 12/608,117, 45 pages.
Final Office Action of Jan. 27, 2014 for U.S. Appl. No. 13/563,708, 35 pages.
Non-Final Office Action of Jan. 30, 2014 for U.S. Appl. No. 13/413,158, 19 pages.
Notice of Allowance of Feb. 12, 2014 for U.S. Appl. No. 13/157,936, 33 pages.
Final Office Action of Feb. 19, 2014 for U.S. Appl. No. 13/961,072, 35 pages.
Non-Final Office Action of Feb. 20, 2014 for U.S. Appl. No. 10/980,613, 43 pages.
Notice of Allowance of Feb. 28, 2014 for U.S. Appl. No. 09/922,753, 13 pages.
Notice of Allowance of Mar. 25, 2014 for U.S. Appl. No. 12/504,265, 31 pages.
Notice of Allowance of Mar. 31, 2014 for U.S. Appl. No. 12/725,999, 41 pages.
Notice of Allowance of Apr. 1, 2014 for U.S. Appl. No. 13/413,197, 32 pages.
International Preliminary Report on Patentability for PCT Application No. PCT/US2013/29389, mailed Sep. 18, 2014, 6 pages.
International Preliminary Report on Patentability for PCT Application No. PCT/US2013/025142, mailed Aug. 21, 2014, 5 pages.
Non-Final Office Action of Jul. 17, 2014 for U.S. Appl. No. 11/394,078, 16 pages.
Non-Final Office Action of Jul. 31, 2014 for U.S. Appl. No. 13/080,324, 17 pages.
Non-Final Office Action of Aug. 21, 2014 for U.S. Appl. No. 10/980,613, 17 pages.
Notice of Allowance of Sep. 17, 2014 for U.S. Appl. No. 13/413,158, 14 pages.
Notice of Allowance of Sep. 26, 2014 for U.S. Appl. No. 13/563,708, 8 pages.

* cited by examiner

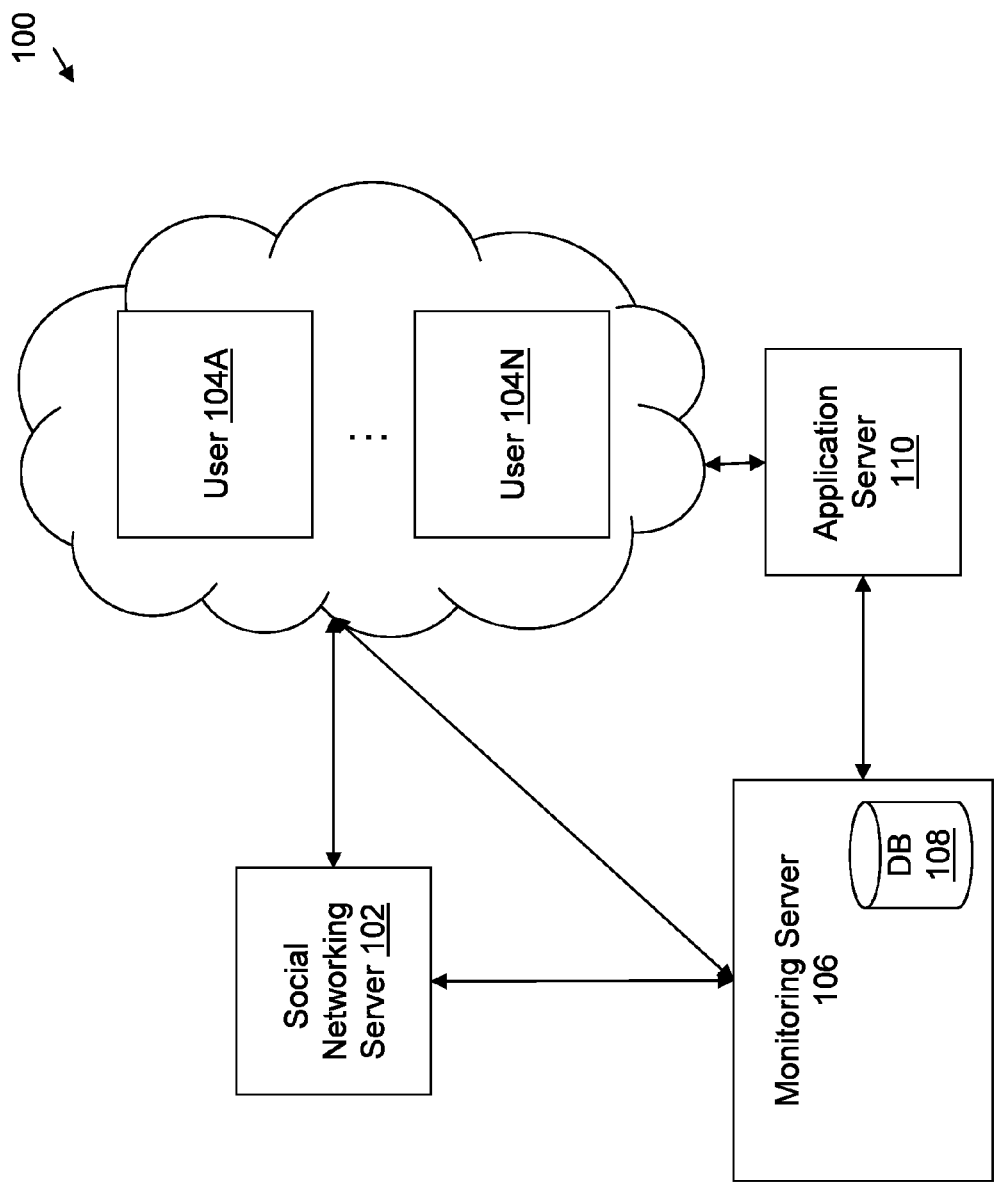

AUTHENTICATION OF SERVICE REQUESTS INITIATED FROM A SOCIAL NETWORKING SITE

FIELD OF THE INVENTION

The present invention relates generally to computer-based methods and apparatuses, including computer program products, for authentication of service requests initiated from a social networking site.

BACKGROUND

With the advent of social networking sites (e.g., Facebook, Twitter, MySpace, LinkedIn, and other social networking sites), it has become increasingly common for people to publicly share information. Social networking sites typically allow a user to create and maintain their own unique user profile that contains personal information about themselves (e.g., their name, residence, hobbies, etc.). Once a user becomes a member of a social networking site, the user can communicate with other users of the social networking site (e.g., with a specific individual, with a group of individuals, or with all users of the social networking site).

A user can send messages or post updates to one or more other users (for example, at their own volition, or in response to a previous message or update from themselves or another user). These updates can include any type of information, often being limited only by the user's imagination. Some messages include status updates that describe what the user is currently doing at the time of the status update, or what the user intends to do in the near future. Some updates express a user's satisfaction (or dissatisfaction) with a product or experience. Some updates ask questions to other users of the social networking site. Depending on the context, it is desirable to monitor the content of the messages or updates and to allow the user or people (e.g., associated with the user in some way, such as a friend of the user, a contact of the user, members of the same group of the user) to initiate service requests.

SUMMARY OF THE INVENTION

The techniques described herein provide computerized methods, apparatuses, and computer program products for authentication of service requests initiated from a social networking site. Such authentication facilitates, for example, provisioning service requests to users of the social networking site only upon authorization of the requesting users.

In one embodiment, the invention features a computerized method for authenticating user service requests from a social networking site. The method includes monitoring, at a server, data representing messages posted at a social networking server. The method includes storing, by the server, data representing a selected message and an originator of the selected message. The method includes transmitting, from the server, data representing a reply to the originator of the selected message for posting at the social networking server, the reply including data that causes transmission of a service request to the server when actuated. The method includes receiving, at the server, data representing the service request and a sender of the service request. The method includes retrieving, by the server, data representing a user profile of the sender of the service request from the social networking server. The method includes comparing, by the server, one or more attributes of the user profile of the sender against one or more attributes of the stored data representing the originator of the selected message in order to verify the one or more attributes of the user profile. The method includes processing, by the server, the service request from the sender if the one or more attributes of the user profile of the sender match the one or more attributes of the stored data representing the originator of the selected message.

In another embodiment, the invention features a computer program product, tangibly embodied in a non-transitory computer readable medium. The computer program product includes instructions being configured to cause a data processing apparatus to monitor data representing messages posted at a social networking server. The computer program product includes instructions being configured to cause a data processing apparatus to store data representing a selected message and an originator of the selected message. The computer program product includes instructions being configured to cause a data processing apparatus to transmit data representing a reply to the originator of the selected message for posting at the social networking server, the reply including data that causes transmission of a service request to the server when actuated. The computer program product includes instructions being configured to cause a data processing apparatus to receive data representing the service request and a sender of the service request. The computer program product includes instructions being configured to cause a data processing apparatus to retrieve data representing a user profile of the sender of the service request from the social networking server. The computer program product includes instructions being configured to cause a data processing apparatus to compare one or more attributes of the user profile of the sender against one or more attributes of the stored data representing the originator of the selected message in order to verify the one or more attributes of the user profile. The computer program product includes instructions being configured to cause a data processing apparatus to process the service request from the sender if the one or more attributes of the user profile of the sender match the one or more attributes of the stored data representing the originator of the selected message.

In another embodiment, the invention features an apparatus for authenticating user service requests from a social networking site. The apparatus includes a database configured to store data representing a selected message and an originator of the selected message. The apparatus includes a server in communication with the database with a processor and memory configured to monitor data representing messages posted at a social networking server. The server is configured to transmit data representing a reply to the originator of the selected message for posting at the social networking server, the reply including data that causes transmission of a service request to the server when actuated. The server is configured to receive data representing the service request and a sender of the service request. The server is configured to retrieve data representing a user profile of the sender of the service request from the social networking server. The server is configured to compare one or more attributes of the user profile of the sender against one or more attributes of the stored data representing the originator of the selected message in order to verify the one or more attributes of the user profile. The server is configured to process the service request from the sender if the one or more attributes of the user profile of the sender match the one or more attributes of the stored data representing the originator of the selected message.

In other examples, any of the aspects above can include one or more of the following features. The service request can be a request to initiate a chat session. Comparing can include comparing a person attribute in the user profile to a person attribute in the stored data representing the originator to determine whether the sender is the originator of the selected message. Comparing can include comparing a follower attribute in the user profile to a follower attribute in the stored data representing the originator to determine whether the sender is a follower of the originator of the selected message.

In some examples, comparing includes comparing a location attribute in the user profile to a location attribute in the stored data representing the originator to determine whether the sender is in a same location as the originator of the selected message. Retrieving the data representing a user profile can include transmitting data representing an access authorization to the sender of the service request for authorization to retrieve the data representing the user profile, and receiving data representing a response to the access authorization, the response including data indicative of the sender providing access authorization.

In other examples, processing the service request includes transmitting a request to a chat server to establish a chat between the sender of the service request and a third party. Data representing a second user profile of the originator of the selected message can be retrieved from a second social networking server. Data representing the reply can be transmitted to the originator at the second social networking server. An aggregated social media profile for the originator including the second user profile and the data representing the selected message and the originator of the selected message can be stored.

In some examples, the social networking server provides a social networking service to users, the social networking service including a social networking service provided by a social networking site selected from the group consisting of twitter.com, facebook.com, myspace.com, or any combination thereof. The service request can be an advertisement request, a support request, a voice call request, or any combination thereof.

In other examples, the social networking server provides a social networking service to users, the social networking service including a social networking service provided by a social networking site selected from the group consisting of twitter.com, facebook.com, myspace.com, or any combination thereof. The server can include a user interface configured to display the data representing messages posted at the social networking server.

The techniques, which include both methods and apparatuses, described herein can provide one or more of the following advantages. Information can be retrieved from social networking sites based on keywords and reacted to as desired (e.g., by a predefined set of rules). If, for example, a message posted by an originating user includes one or more keywords of interest, a response (e.g., posted reply message) can be sent to the originator of the message that includes invocable data to initiate a service request by a user of the social networking site (e.g., by the originator or other users of the social networking site). Once initiated, the system can authenticate the initiator of the service request (e.g., based on a user profile of the initiator) to verify that, for example, the service request is only granted to a desired audience of the social networking site (e.g., to verify that the initiator profile matches the originator profile, or the initiator profile is related to the originator profile). Advantageously, services such as advertisements, chat services, live help, and other services can be provided to a targeted group of users of social networking sites.

Social media profiles can be created for users of the social networking site that includes account information for the users aggregated across a plurality of social networking sites to which the user belongs (e.g., for users that post messages that are responded to by the system described herein). The aggregated social media profile can be used to respond to an originator of a message at any one of the originator's many social media services. Advantageously, the targeted group of users for the services is spread across multiple social networking sites.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

FIG. 1 is a diagram showing an exemplary system for implementing service requests for a social networking site;

DETAILED DESCRIPTION

Figure 2A:
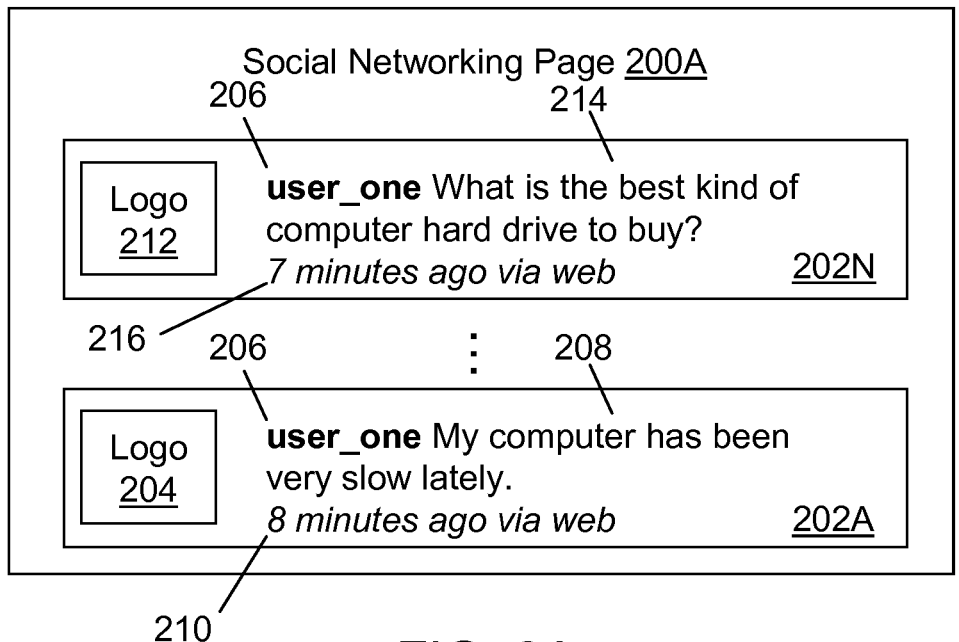
FIGS. 2A and 2B are diagrams of an exemplary social networking page for a social networking site according to the present invention.

In general overview, computerized systems and methods are provided for provisioning services to authenticated users of social networking services provided by social networking sites. Social networking sites (or social media) can be monitored so that messages of interest (e.g., posted by users of the social networking sites) are responded to and provided with invocable data to initiate a service request. The actuator of the service request (which can be the originator of the identified message or another user of the social networking site) is authenticated before providing the actuator with the service associated with the service request. In some examples, the user profile (or data profile, e.g., which is requested from the social networking site) associated with the actuator of the service request is compared against the stored data for the associated identified message (e.g., a user profile for the user that initiated the associated identified message) to authenticate one or more attributes between the originator of the identified message and the actuator of the service request.

FIG. 1 is an exemplary diagram showing an exemplary system 100 for implementing service requests for a social networking site. The system 100 includes a social networking server 102. The social networking server 102 is in communication with a plurality of user devices 104A through 104N (collectively referred to herein as user devices 104). The social networking server 102 is also in communication with a monitoring server 106, which includes a database 108. The monitoring server 106 is also in communication with user devices 104. Application server 110 is in communication with user devices 104 and the monitoring server 106. The computerized elements of system 100 can be in communication using, for example, the internet, cellular links, and/or any other type of data or voice communication.

The social networking server 102 can be, for example, a single web server with a processor and memory, or a plurality of web servers configured to provide a social networking service to the user devices 104. The social networking services can include, for example, providing computerized services for the user to maintain or update their profile with the social networking site, providing computerized services that facilitate communication with other users of the social networking site, providing computerized services for posting communications or messages, and other services offered through social networking sites. The social networking services can include those service provided by, for example, twitter.com, facebook.com, myspace.com, or linkedin.com. The social networking site provides an application programming interface (API) that facilitates monitoring keywords in messages or other data used within the social networking service (e.g., which can be viewed by user devices 104). Although the following description is directed to an embodiment involving the social networking site twitter.com, the described computerized systems and methods are not so limited and can be applied to other social networking sites, such as facebook.com, myspace.com, or linkedin.com.

The API is an interface implemented by the social networking site that enables other software programs (e.g., a program executed by the monitoring server 106) to interact with the social networking site. The social networking site provides services through the API, and the API allows the other software programs to access the services. For example, the API services can include services to monitor keywords contained within user communications posted in the social networking site, services to post communications (e.g., messages) to users of the social networking site, or services to obtain information about users of the social networking site (e.g., user profile information).

The user devices 104 are computing devices with a processor and memory that can interact with the social networking site. For example, the user devices 104 can include desktop computers, laptop computers, tablet PCs, and/or smart phones. A user of a social networking site can use a user device 104 to log into the social networking site and to use the provided social networking services. A user can use any user device 104; they profile information for a user can be determined independently for a user from the actual user device 104.

The monitoring server 106 is a computing device having a processor and memory that uses the API for the social networking site to monitor one or more configurable keywords. For example, a computer hardware company that specializes in selling computer hard drives may want to automatically monitor user posts (or messages) to the social networking server 102 to identify posts that includes keywords or phrases related to their business. Advantageously, the monitoring server 106 can receive information based on the keywords and react to the keywords as desired (e.g., if a question is posted from a user device 104 about "hard drives," the monitoring server can transmit a link to the user device 104 that, when invoked, establishes a chat connection with a person who is knowledgeable about hard drives and who can answer the question transmitted from the user device 104).

For example, the Twitter social networking site provides an API that allows the monitoring server 106 to monitor keywords contained within tweets. A tweet is a posted message that is viewable by users of the twitter.com site. The monitoring server 106 can interface with the twitter social networking site using the API (e.g., by subscribing to a service through the API, such a notification service that pushes information to programs that implement certain functions of the API) with one or more keywords to receive notifications that the keyword is being tweeted, the number of tweets that include the keyword, the number of followers that can see the tweet, and/or other pertinent information. When the monitoring server 106 identifies a keyword, the monitoring server 106 can send a reply tweet to the user that posted the tweet containing the keyword. The database 108 is configured to store data representing selected messages or tweets (e.g., those that contain the monitored keyword) and an originator of the selected message (e.g., which user device 104 transmitted the selected message to the social networking server 102).

The monitoring server 106 can be in communication with an operator terminal (not shown) that includes a graphical user interface configured to display the data representing messages posted at the social networking server 102. For example, the monitoring server 106 can display information about the identified messages that include the one or more monitored keywords. The information about the messages can include, for example, the date of the message, the number of followers of the user that posted the message (e.g., people who are subscribed to see the particular message and any related messages), the number of friends of the posting user (e.g., the number of people the posting user has established a relationship with in the social networking site), the geographical location of the posting user (e.g., to the country level, state level, city level, etc.), an identifier for the message, a token for the message (e.g., an Open Authorization (OAuth) token), the source of the message (e.g., the user posted the message via the web, via a mobile device, etc.), the content of the message, the number of messages related to the posted message (e.g., the number of messages in the message string that contained the posted message, such as the count of tweets), the user image associated with the posting user (e.g., a picture of the user), the name of the posting user, a user name associated with the posting user in the social networking site (e.g., a screen name for the user), and/or other information gleaned from the message (e.g., based on the posted message itself, a user profile associated with the posting user, or other information from the social networking site).

An operator can view the graphical user interface provided by the operator terminal to decide how to respond to the identified message/post. For example, the operator may decide not to respond to the identified message based on one or more criteria associated with the identified message (e.g., geographical area, message content, etc.). Or the operator can decide to send a response to the identified message. This process is described in further detail with respect to FIG. 3.

The application server 110 provides one or more services to the user devices 104. The service can include, for example, a chat service (e.g., between the user device 104 and a third party, such as a person knowledgeable about a question posed from the user device 104), an advertisement service (e.g., advertisements related to the keywords of the user's message), a support service (e.g., documents or links to documents related to the user's message), and/or a voice service (e.g., the service facilitates a call between the user and a third party, such as a person knowledgeable about a question posted from the user device 104). For example, as will be further described below, the monitoring server 106 can, through the API, post a message in reply to a posted message, the posted message containing a link (e.g., a URL). The link, once invoked by a user device 104, initiates a service with the application server 110. The monitoring server 106 can authenticate the user device 104 before providing the service to the user (e.g., as described with reference to FIG. 4 below based on a data/user profile associated with the user device 104).

Figure 2B:
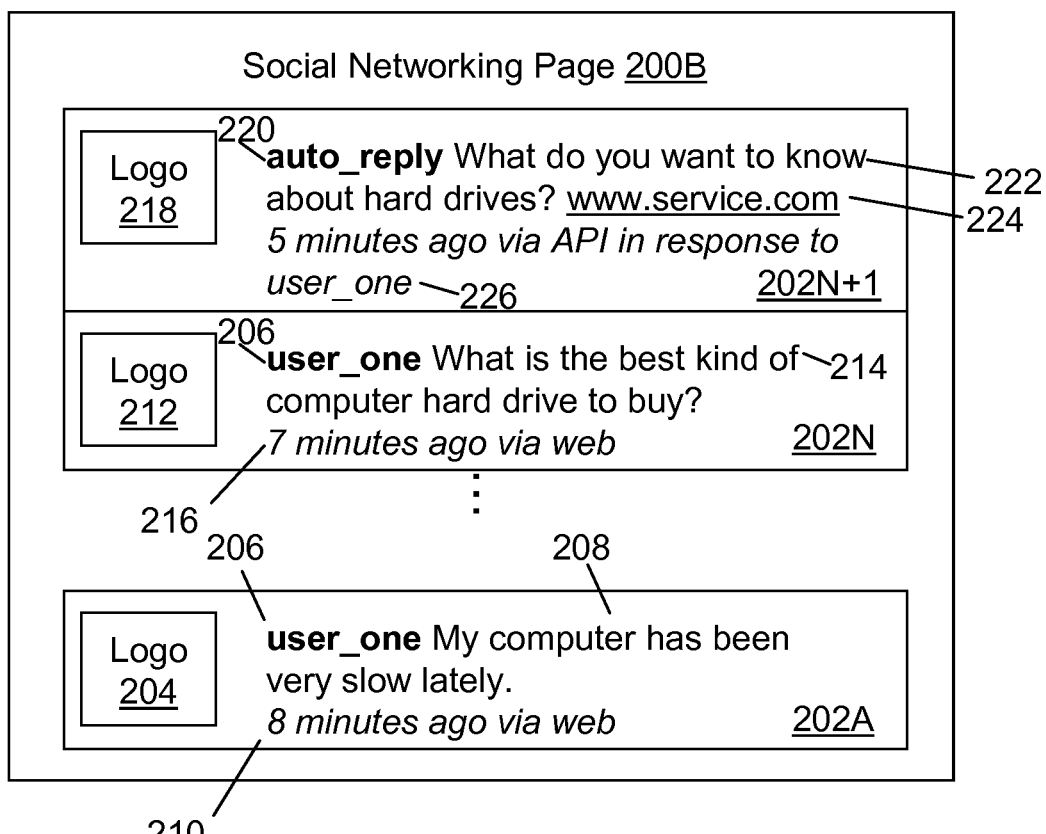

FIGS. 2A and 2B are diagrams of exemplary social networking pages 200A and 200B, respectively, for a social networking site according to the present invention. Social networking page 200A includes posted messages 202A through 202N (collectively posted messages 202). Posted message 202A includes a logo 204, username user_one 206, content 208 (i.e., "My computer has been very slow lately"), and posting information 210 (i.e., "8 minutes ago via web"). The username user_one 206 indicates which user posted the message 202A (e.g., a user of a user device 104). This is advantageous, for example, to tell users apart when multiple user devices 104 are posting messages for a particular message thread or message board. The content 208 is the text that the posting user user_one 206 entered for the posted message 202A. The posting information 210 indicates how long ago user_one 206 posted the message 202A (i.e., 8 minutes ago) and how user_one 206 posted the message (i.e., via the web).

Posted message 202N includes a logo 212, username user_one 206, content 214 (i.e., "What is the best kind of computer hard drive to buy?"), and posting information 216 (i.e., "7 minutes ago via web"). Posted messages 202 are used for illustrative purposes only and are not intended to be limiting. One skilled in the art can appreciate that the information contained within the posted messages 202 can be modified without departing from the spirit of the techniques described herein.

Referring to FIG. 1, user_one 206 (where "user_one" is a screen name representative of user device 104 or of an operator of the user device 104) posted message 202A to the social networking server 102. One minute later user_one 206 posted the posted (using a user device 104) message 202N to the social networking server 102. User_one 206 can configure his account with the social networking site to control which other users can see posted messages 202A and 202N. There can be posted messages by other users between posted messages 202A and 202N (e.g., a different user device 104 can post a message in response to posted message 202A). For example, all people following the posts on social networking page 200A can see posted message 202A and can choose to post a message in response. Similarly, for example, any person that user_one 206 has established a relationship within the social networking site (e.g., friends) can view the posted message 202A, and/or any user device 104 can view posted message 202A.

The social networking page 200B in FIG. 2B includes posted messages 202A and 202N from FIG. 2A and also includes posted message 202N+1. Posted message 202N+1 includes a logo 218, username auto_reply 220, content 222 (i.e., "What do you want to know about hard drives?"), a link 224 that causes transmission of a service request to the monitoring server 106, and posting information 226 (i.e., "5 minutes ago via API in response to user_one"). The posting information 226 indicates that posted message 202N+1 was posted by auto_reply 220 (e.g., a user with the screen name "auto_reply," which may correspond to an individual user or a company) five minutes ago via an API (e.g., an API to the social networking site provided by social networking server 102, which allows messages to be posted in response to a user's message) in response to the posted message 202N by user_one 206. Message 202N+1 will be discussed in further detail with respect to FIG. 3 below. The posted message 202N+1 can be transmitted automatically (e.g., by the monitoring server 106 based on rules stored in the database 108) or manually (e.g., by an operator of the monitoring server 106).

Figure 3:
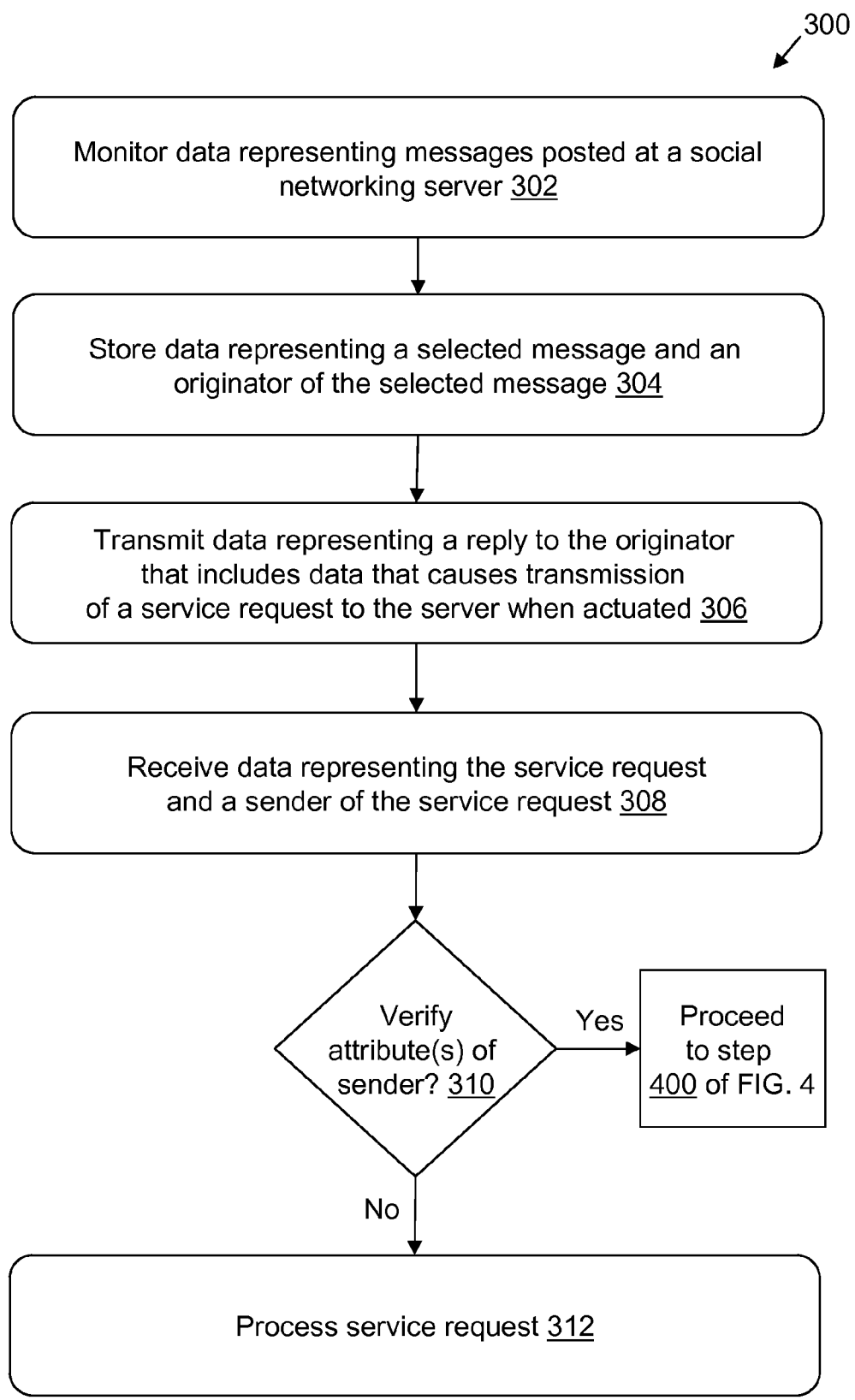
FIG. 3 is a flow chart showing an exemplary method for processing a service request.

FIG. 3 is an exemplary flow chart showing an exemplary method 300 for processing a service request. Referring to FIG. 1, at step 302 the monitoring server 106 monitors data representing messages posted at the social networking server 102. At step 304, the monitoring server 106 stores data representing a selected message and an originator of the selected message. At step 306, the monitoring server 106 transmits data representing a reply to the originator of the selected message (e.g., to the originating user device 104) for posting at the social networking server 102. The reply includes data that causes transmission of a service request to the monitoring server 106 when actuated. At step 308, the monitoring server 106 receives data representing the service request and a sender of the service request (e.g., which user device 104 actuated the data that causes transmission of the service request).

At step 310, the monitoring sever 106 determines whether to verify one or more attributes of the sender of the service request. For example, the monitoring server 106 can determine whether or not to verify attributes of the sender based on the data of the sender (e.g., the attributes in the data). In some examples, the monitoring server 106 can be configured (e.g., via a stored variable) to automatically verify, or not verify, the attributes of the sender. If the monitoring server 106 is configured to verify one or more attributes, the method 300 proceeds to step 400 of FIG. 4. If the monitoring server is not configured to verify the attributes of the sender, the method 300 proceeds to step 312 and the monitoring server processes the service request.

Referring to step 302, the monitoring server 106 monitors data representing messages posted at the social networking server 102. For example, users of the social networking site Twitter post tweets to the social networking server 102. The monitoring server 106 accesses information about these posted tweets (messages) from the social networking server 102 using, for example, an API provided by Twitter. The monitoring server 106 can be configured to store particular information (or attributes) from the social networking sever 102 using the API. The monitoring server 106 can use the acquired information to determine whether to engage the user that posted the message. In some examples, the monitoring server 106 presents a graphical user interface that displays the acquired information to an operator that decides how to respond to the message (e.g., not to respond or to respond).

For example, referring to FIG. 2A, a computer company that sells hard drives can configure the monitoring server 106 to monitor messages posted to social networking server 102 for particular keywords related to hard drives. For example, the monitoring server 106 can be configured to monitor the content of messages posted at social networking server 102 for the keywords "hard drive" and "buy." Advantageously, if a message includes these keywords, the monitoring server 106 can take appropriate action such that a message is transmitted in response to the posted message (e.g., to provide a link that, once clicked, facilitates setting up a chat session between the user and a third party to help the user with purchasing a hard drive, or to provide an advertisement for hard drives that are provided by the computer company). An exemplary social media monitoring tool is the tracx platform provided by tracx of Hoboken, N.J.

Referring to step 304, the monitoring server 106 can store data for a selected message if the selected message includes data (e.g., keywords in the message content, a particular user name, a posting time of the message, etc.) that the monitoring server 106 is configured to identify in the posted messages. For example, continuing with the computer company example described above with respect to step 302, if the monitoring server 106 identifies a message that includes one or more of the keywords "hard drive" and/or "buy," the monitoring server 106 can store data indicative of the message and/or the originator of the message in database 108. Advantageously, the stored data for the message and/or the originating user can be used to authenticate the requestor of a service request associated with the message.

Referring to step 306, the monitoring server 106 transmits a reply to the originator of the selected message. For example, referring to FIG. 2B, the monitoring server 106 transmits message 202N+1 to user_one 206, using the social networking server 102, in response to message 202N posted by user_one 206. Message 202N+1 includes content 222 and link 224 that causes transmission of a service request to the monitoring server 106. For example, link 224 can be a chat invitation (e.g., an invitation to a two-way chat between the user device 104 and a second device). If a user of a user device 104 clicks the link 224, the user device 104 can be redirected to the application server 110 to open up a chat (which is described in further detail with respect to step 312 below).

Referring further to step 306, some social networking sites provide constraints on who can respond to a posted message. The monitoring server 106 can transmit the reply (e.g., using the API for the social networking site) in such a way that it complies with the social networking site constraints and still responds to the user's posted message. For example, when using Twitter there may not be a way to send a twitter message to a user device 104 if the posting party (e.g., the monitoring server 106) is not following the tweets that included the identified message. Continuing with the computer company example, if the monitoring server 106 is not following the account of user_one 206 (e.g., not following the tweets of user_one 206), then the monitoring server 106 can not send user_one 206 a direct message. To comply with these social networking site constraints, the monitoring server 106 can, for example, send a public tweet and/or send a comment (e.g., a single message to tweeter or a broadcast message to everyone following the tweet).

Referring to step 308, the monitoring server 106 receives data representing the service request. For example, the monitoring server 106 receives data indicative of a user of a user device 104 clicking on the link 224. Depending on the social networking site (and/or how a user configures their account with the social networking site), there may not be any guarantee that the user to whom the monitoring server 106 transmitted message 202N+1 is also the same user that clicked on the link 224. For example, if one or more users are following the message chain of user_one 206 that includes messages 202A, 202N and 202N+1, then not only can user_one 206 click the link 224, but so can any of the other users that are viewing the social networking page 200B. In some examples, any user of the social networking site can view the social networking page 200B (and therefore any user can click the link 224). Therefore, in some embodiments it may be desirable to verify attributes of the sender (e.g., to verify the attributes of the user profile for the user that clicked link 224) to determine whether that the monitoring server 106 will provide the service to the sender. The verification process is described in further detail with respect to FIG. 4.

Referring to step 312, the monitoring server 106 processes the service request. For example, the service request can be a request to initiate a service provided by application server 110. For example, the application server 110 can be a chat server, and the service request can be a request to initiate a chat session between the user that initiated the service request and a second user (e.g., through the application server). The monitoring server 106 can process the service request to chat by transmitting a request to application server 110 to establish a chat between the sender of the service request and a third party. Returning to the computer company example, if user_one 206 clicks on link 224, the monitoring server 106 can instruct the application server 110 to set up a chat session between the initiating user and an expert from the computer company. The expert can be, for example, an expert in the field of computer hard drives. Advantageously, this allows the initiating user to have a chat with the expert about hard drives. Such chat conversations allow the initiating user to have live-time discussions to learn information and/or answer any questions they have about a particular topic.

In some examples, the expert is matched up with the initiating user based on one or more criteria. For example, the application server 110 can select the expert based on one or more skills (e.g., technology advisors, social media agents, etc.). Advantageously, the monitoring server (and/or the application server 110) can direct the initiating user to the person who will help the most. In some examples, the expert is selected based on the content of the messages (e.g., messages that contain certain keywords related to the company, keywords indicative of questions (e.g., "why" or "?"), etc.). While the monitoring server 106 can select the expert based on the content of the messages, the monitoring server 106 can also select the user based on other criteria (e.g., the initiating user's social media profile). For example, as described above, the monitoring server 106 can select the expert based on other information known about the messages such as, for example, the date of the message, the number of followers or friends, geographical location, etc.

While the term "expert" is used to describe the second person of the chat conversation, this term is used to not only to represent a person with particular knowledge about a field (e.g., a person knowledgeable about computer hard drives), but can also be used to refer to any person who can help the initiating user (e.g., by answering questions, directing them to other websites, providing information, etc.).

In some examples, the service request is an advertisement request. For example, the content of message 202N+1 can direct a viewer to click the link 224 for a coupon. In some examples, the service request is a support request. In some examples, the service request is a voice call request. For example, the service request can include data indicative of a phone number for the requesting user and a request that the requesting user be called at the phone number. In some examples, the user is presented with a dialog box (e.g., as a web page or as an applet) that allows the user to provide their contact information.

Figure 4:
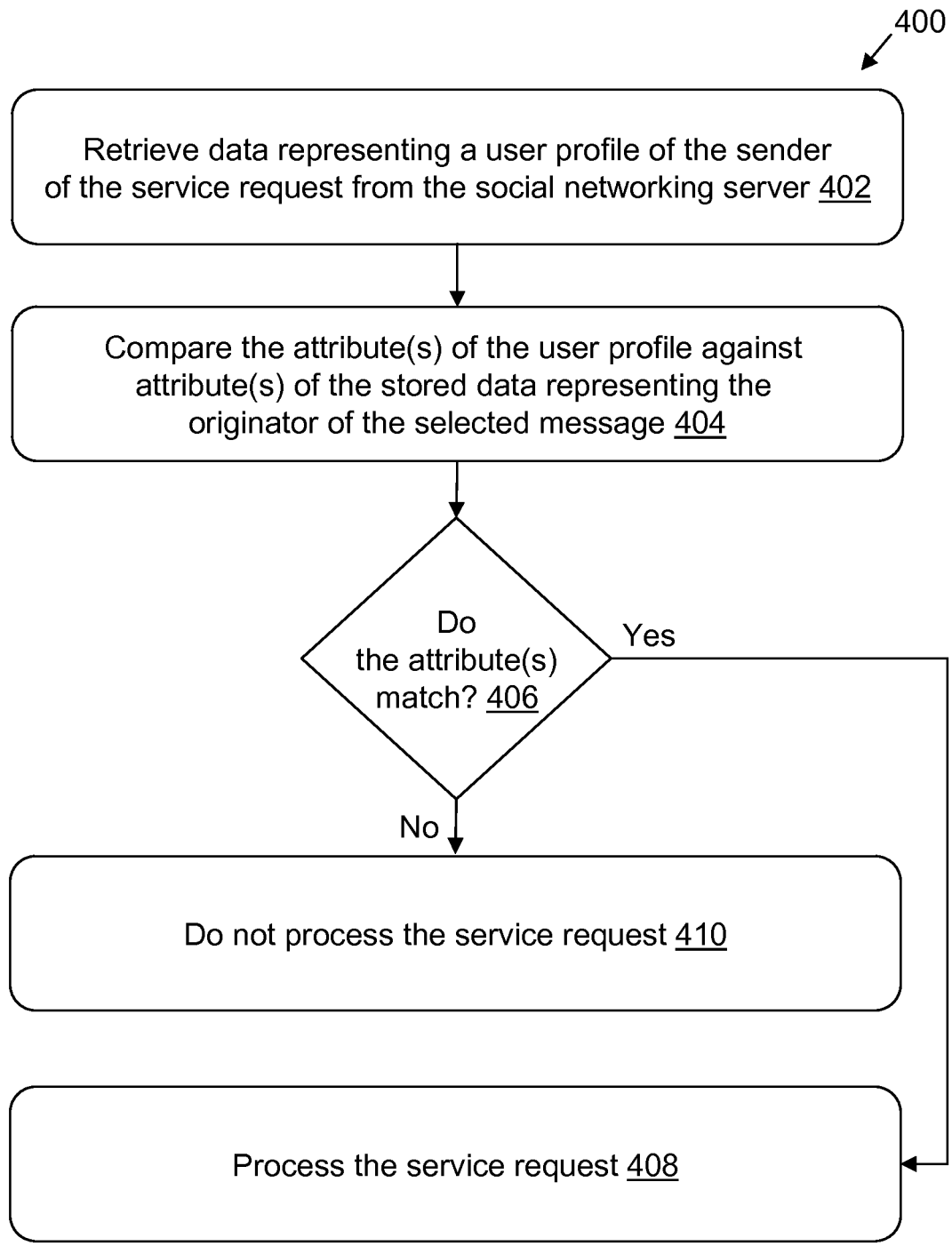
FIG. 4 is a flow chart showing an exemplary method for authenticating a service request.

FIG. 4 is a flow chart showing an exemplary method 400 for authenticating a service request. Method 400 provides for Open Authorization (OAuth), where the monitoring server 106 can authenticate the sender of the service request without the sender providing additional information (e.g., a username and/or password). At step 402, the monitoring server 106 retrieves data representing a user profile of the sender of the service request from the social networking server 102 (e.g., retrieves the profile of the sender identified in the data obtained in step 308 of FIG. 3). At step 404, the monitoring server 106 compares one or more attributes of the user profile of the sender against one or more attributes of the stored data representing the originator of the selected message in order to verify the one or more attributes of the user profile. At step 406, the monitoring server 106 determines whether the compared attributes match. If the one or more attributes match, the method proceeds to step 408 and the monitoring server 106 processes the service request. If the one or more attributes do not match, the monitoring server 106 proceeds to step 410 and does not process the service request and optionally can provide a default response (e.g., presentation of a company home web page).

Referring to step 402, the monitoring server 106 can retrieve data representing the sender from the social networking server 102 using, for example, an API provided by the social networking site that is being provided by the social networking server. The monitoring server 106 may request authorization from the sender of the service request before retrieving data about the sender. For example, the monitoring server 106 can transmit an authorization request to the sender (e.g., via a pop-up dialog box, a web page, etc.). The authorization request can be, for example, data representing an access authorization to retrieve the data representing the requesting user's profile from the social networking server 102. The authorization request has a mechanism (e.g., graphical interface buttons, check boxes, etc.) for the sender to indicate either that they do or do not authorize the monitoring server 106 to retrieve data from the social networking sever 102 about them. When the user operates the mechanism, the monitoring server 106 receives data representing a response to the access authorization. If the monitoring server 106 receives data indicative of a denial from the sender, then the monitoring server 106 can terminate method 400 and not retrieve data representing the user from the social networking server 102. If the monitoring server 106 receives data indicative of the sender providing access authorization, then the monitoring server 106 is authorized to request information from the social networking server 102 (e.g., the sender's user profile).

In some examples, the authorization request is embedded in the social networking site. In some examples, when the requesting user clicks link 224, the link 224 can redirect the user to a servlet that prompts the user with the authorization request (e.g., a Java servlet, or some other protocol by which the monitoring server 106 can respond to the HTTP request). This request can be a request to begin the OAuth stage of method 400. If the monitoring server 106 receives authorization, the monitoring server can request any appropriate information from the social networking server 102 (e.g., the user profile). The monitoring server 106 can retrieve stored information for the originator of the selected message from database 108 (e.g., which was stored in step 304 of method 300). The information retrieved from the social networking server 102 can include, for example, any information that the monitoring server 106 can use to verify the user profile against the originator of the selected message. For example, the information retrieved from the social networking server 102 can include the date of the message, the number of followers of the user, the number of friends of the user, the user's geographical location, an identifier for the message, a token for the message, the source of the message, the content of the message, the number of messages related to the posted message, the user's image, the name of the user, a user name associated with the user, and/or other information gleaned from the message.

Referring to steps 404 and 406, the monitoring server 106 can verify one or more attributes of the user profile and the originator of the selected message. In some examples, the monitoring server 106 can verify that the originator of the message is the sender of the service request. For example, the monitoring server 106 can compare a person attribute in the user profile to a person attribute in the stored data representing the originator to determine whether the sender is the originator of the selected message. If the person attributes match, then the monitoring server 106 successfully validated that the sender is the originator of the selected message. For example, referring to FIG. 2B, user_one 206 posted message 202N, and this information is stored in the database 108. The stored information includes a person attribute indicative of user_one 206. If the user_one 206 clicked the link 224 in message 202N+1, then the monitoring server 106 will receive a person attribute indicative of user_one 206 in response to its request for information about the sender of the service request. Since the person attribute for the originator of message 202N is the same as the person attribute for the sender of the service request, the monitoring server 106 can identify that the same user clicked the link 224. Advantageously, the monitoring server 106 can process the service request (e.g., step 408) since the service request was effected by an intended recipient of the service request.

In some examples, the monitoring server 106 can verify one or more attributes between the user profile and the originator of the selected message that are not unique to the originator of the selected message. For example, the one or more attributes can be shared by a group of people (e.g., and the monitoring server 106 can be configured to engage with members of the particular group). Advantageously, the monitoring server 106 need not verify that the service request was effected by the same user that posted the message, but can verify other characteristics, such as characteristics of user profiles. For example, the monitoring server can verify whether there is any relationship between the originator of the message and the sender of the service request (e.g., if they are friends in the social networking site), whether they are located within a same geographical area, whether they share one or more common interests or hobbies, and/or other attributes. For example, the monitoring server 106 can verify the sender of the service request is a follower of the originator of the selected message. The monitoring server 106 can compare a follower attribute in the user profile to a follower attribute in the stored data representing the originator to determine whether the sender is a follower of the originator of the selected message. Advantageously, by performing such comparisons, the monitoring server 106 can determine that the sender of the service request is likely to share one or more attributes or characteristics with the originator of the message, and therefore is likely to be a proper audience for the service request.

In some examples, the monitoring server 106 verifies the sender of the service request is in the same geographical location as the originator of the message. For example, the monitoring server 106 can compare a location attribute in the user profile to a location attribute in the stored data representing the originator to determine whether the sender is in a same location as the originator of the selected message. Advantageously, by comparing the location information, the monitoring server 106 can verify that, for example, targeted advertisements are provided to appropriate recipients.

Advantageously, the monitoring server 106 can determine if the sender of the service request is the same person as the originator of the selected message based on, for example, a user ID, date, time, location (e.g., the location of the message, based on packet information and geographical location information), and any other attributes relevant to identifying the sender of the service request. Advantageously, because the monitoring server 106 has stored data for the selected message, the monitoring server 106 is not limited to matching the identity of the sender and the originator. As another example, the monitoring server 106 can determine whether the sender of the service request is a "friend" of the selected message. For example, the monitoring server 106 can determine whether the sender has some relationship in the social network to the originator of the selected message (e.g., as indicated between their user profiles). As an illustrative example, the monitoring server 106 can use an identification field in the originator's profile and use the identification field to get all the followers of the originator (e.g., via the social networking site's API). The monitoring server 106 can perform a basic search of the retrieved list of followers to determine whether the sender of the service request is a follower of the originator of the stored message.

Referring to step 408, after the sender of the service request is authenticated, the sender can be redirected based on their user profile. For example, the sender can be redirected to a chat session with an expert. The application server 110 can select the expert based on one or more skills of the expert (e.g., technology advisors, social media agents, etc.) based on the sender's user profile. For example, as described above, the monitoring server 106 can select the expert based on the number of followers or friends in the sender's user profile, the geographical location in the user's profile, etc.

Referring to step 410, the monitoring server 106 can perform other actions even though the monitoring server 106 does not process the service request. For example, the sender of the service request can be directed to a particular web page (e.g., a landing page). For example, the sender can be directed to a default advertisement, a web page that explains the authentication process, a web page that explains why the sender was not provided with the service request, and/or the like.

In some examples, the monitoring server 106 can monitor a first social networking site and respond to messages posted at the first social networking site through a second social networking site. For example, referring to method 300 in FIG. 3, the monitoring server 106 can monitor data indicative of messages posted at social networking server 102. The monitoring server 106 can retrieve data representing a second user profile of the originator of the selected message from a second social networking server (e.g., from a different social networking server than social networking server 102, which is not shown in FIG. 1). Referring to step 306, the monitoring server 106 can transmit data representing the reply to the originator at the second social networking server (e.g., and not through the social networking server 102).

For example, the monitoring server 106 can monitor tweets posted to Twitter (e.g., via the Twitter API). If the monitoring server 106 desires to respond to a tweet (e.g., the tweet includes one or more keywords of interest), the monitoring server 106 can identify one or more additional social networking sites that the originator of the selected message belongs to (e.g., other social networking sites where the originator has an account). For example, the monitoring server 106 can determine that the originator has a Facebook account. The monitoring server 106 can transmit a reply (based on the originator's tweet) to the originator via Facebook instead of through Twitter.

In some examples, the monitoring server 106 stores an aggregated social media profile for the originator comprising any other user profiles (or information) for the originator at other social media services. The monitoring server 106 can also store the data representing the selected message and the originator of the selected message in the aggregated social media profile. Advantageously, the monitoring server 106 can use the aggregated social media profile to respond to the originator at any one of its many social media services. The social media server 102 can provide multiple social networking sites, a single social media server 102 can provide a single social networking site, or any combination thereof. The social networking site can include Twitter, Facebook, Myspace, LinkedIn, and/or any other social networking service.

The above-described computerized methods and apparatuses can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computerized method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method, comprising:
accessing social network communications involving multiple social network accounts;
determining that the social network communications include a message that satisfies a response criteria;
storing information that represents a social network account from which the message originated;
transmitting data that causes a service request interface to be accessible through each of the social network accounts;
receiving multiple service requests originating from different social network accounts, wherein each of the service requests results from activation of the service request interface and includes origination information;
identifying a particular one of the service requests as originating from a same social network account as the message, wherein identifying includes:
using the origination information included in the particular service request in accessing a social network profile; and
determining that the accessed social network profile includes information that matches with the stored information, wherein determining that the accessed profile includes information that matches with the stored information includes:
determining a person attribute in the origination information included in the particular service request; and
determining that a person attribute in the accessed profile is the same as the person attribute in the origination information; and
providing content accessible on a device associated with the particular service request.

2. The method of claim 1, wherein determining that the social network communications include a message that satisfies a response criteria includes determining that the message includes content that refers to a business.

3. The method of claim 1, wherein providing content includes facilitating communications, through a chat communications channel, with an agent.

4. The method of claim 1, wherein the data that causes a service request interface to be accessible further causes a request for authorization to access a profile of the social network to be displayed.

5. The method of claim 1, wherein identifying further includes:
receiving information represent authorization to access the profile generated using the social network.

6. The method of claim 1, wherein providing the content is done in response to identifying a particular one of the service requests as originating from a same social network account as the message.

7. The method of claim 1, wherein the social network prevents direct responses from being provided to a social network profile under certain conditions.

8. A system, comprising:
a processor configured to perform operations including:
accessing social network communications involving multiple social network accounts;
determining that the social network communications include a message that satisfies a response criteria;
storing information that represents a social network account from which the message originated;
transmitting data that causes a service request interface to be accessible through each of the social network accounts;

receiving multiple service requests originating from different social network accounts, wherein each of the service requests results from activation of the service request interface and includes origination information;

identifying a particular one of the service requests as originating from a same social network account as the message, wherein identifying includes:
  using the origination information included in the particular service request in accessing a social network profile; and
  determining that the accessed social network profile includes information that matches with the stored information, wherein determining that the accessed social network profile includes information that matches with the stored information includes:
    determining a person attribute in the origination information included in the particular service request; and
    determining that a person attribute in the accessed profile is the same as the person attribute in the origination information; and
  providing content accessible on a device associated with the particular service request.

9. The system of claim 8, wherein determining that the social network communications include a message that satisfies a response criteria includes determining that the message includes content that refers to a business.

10. The system of claim 8, wherein providing content includes facilitating communications, through a chat communications channel, with an agent.

11. The system of claim 8, wherein the data that causes a service request interface to be accessible further causes a request for authorization to access a profile of the social network to be displayed.

12. The system of claim 8, wherein identifying further includes:
  receiving information represent authorization to access the profile generated using the social network.

13. The system of claim 8, wherein providing the content is done in response to identifying a particular one of the service requests as originating from a same social network account as the message.

14. The system of claim 8, wherein the social network prevents direct responses from being provided to a social network profile under certain conditions.

15. A computer program product tangibly embodied in a non-transitory machine-readable storage medium, the storage medium comprising instructions operable to cause a data processing apparatus to perform operations including:
  accessing social network communications involving multiple social network accounts;
  determining that the social network communications include a message that satisfies a response criteria;
  storing information that represents a social network account from which the message originated;
  transmitting data that causes a service request interface to be accessible through each of the social network accounts;
  receiving multiple service requests originating from different social network accounts, wherein each of the service requests results from activation of the service request interface and includes origination information;
  identifying a particular one of the service requests as originating from a same social network account as the message, wherein identifying includes:
    using the origination information included in the particular service request in accessing a social network profile; and
    determining that the accessed social network profile includes information that matches with the stored information, wherein determining that the accessed social network profile includes information that matches with the stored information includes:
      determining a person attribute in the origination information included in the particular service request; and
      determining that a person attribute in the accessed profile is the same as the person attribute in the origination information; and
  providing content accessible on a device associated with the particular service request.

16. The computer-program product of claim 15, wherein determining that the social network communications include a message that satisfies a response criteria includes determining that the message includes content that refers to a business.

17. The computer-program product of claim 15, wherein providing content includes facilitating communications, through a chat communications channel, with an agent.

18. The computer-program product of claim 15, wherein the data that causes a service request interface to be accessible further causes a request for authorization to access a profile of the social network to be displayed.

19. The computer-program product of claim 15, wherein identifying further includes:
  receiving information represent authorization to access the profile generated using the social network.

20. The computer-program product of claim 15, wherein providing the content is done in response to identifying a particular one of the service requests as originating from a same social network account as the message.

21. The computer-program product of claim 15, wherein the social network prevents direct responses from being provided to a social network profile under certain conditions.

* * * * *